I

United States Patent
Maldonado et al.

(10) Patent No.: US 11,677,649 B1
(45) Date of Patent: Jun. 13, 2023

(54) BACKBONE NETWORK PERFORMANCE ANALYSIS

(71) Applicant: Amazon Technologies, Inc., Seattle, WA (US)

(72) Inventors: Orlando Maldonado, Seattle, WA (US); Sandeep Bajaj, San Ramon, CA (US); Stefan Christian Richter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/473,663

(22) Filed: Sep. 13, 2021

(51) Int. Cl.
*H04L 43/0805* (2022.01)
*H04L 43/0829* (2022.01)
*H04L 47/70* (2022.01)

(52) U.S. Cl.
CPC ...... *H04L 43/0805* (2013.01); *H04L 43/0829* (2013.01); *H04L 47/825* (2013.01)

(58) Field of Classification Search
None
See application file for complete search history.

(56) References Cited

U.S. PATENT DOCUMENTS

| | | | | |
|---|---|---|---|---|
| 2004/0208128 A1* | 10/2004 | Lu | ............ | H04L 41/069 370/238 |
| 2010/0309785 A1* | 12/2010 | Sassi | ............ | H04L 47/15 370/232 |
| 2013/0286846 A1* | 10/2013 | Atlas | ............ | H04L 47/726 370/235 |
| 2016/0205043 A1* | 7/2016 | Beers | ............ | H04N 21/64707 370/419 |
| 2019/0306083 A1* | 10/2019 | Shih | ............ | H04L 49/25 |
| 2021/0036987 A1* | 2/2021 | Mishra | ............ | H04L 61/5007 |
| 2021/0409324 A1* | 12/2021 | Byrne | ............ | H04L 45/125 |

\* cited by examiner

*Primary Examiner* — Younes Naji
(74) *Attorney, Agent, or Firm* — Klarquist Sparkman, LLP

(57) ABSTRACT

A backbone service exposes network parameters, such as a minimum available bandwidth, latency, or packet loss, in a tunnel path between any source-destination pairs. The network parameters can be mapped as a function of time so that service teams can schedule when to use the backbone with minimized interruption to other users. The data generated by the backbone service can be transmitted, stored or displayed for informational purposes to provide insights to service teams on how to better leverage the network and create awareness of the current status of the backbone. The backbone service can be extended to provide bandwidth brokerage for controlling traffic distribution in the network. The backbone service can further provide triggered messages that inform service teams about failures in the network that could reduce the available bandwidth. The messages can further target users of affected source-destination pairs.

19 Claims, 9 Drawing Sheets

FIG. 5

EXAMPLE TUNNEL DATA 600:

| SOURCE DEVICE | DESTINATION DEVICE | RESERVED BANDWIDTH | TOTAL CAPACITY | TUNNEL HOPS |
|---|---|---|---|---|
| FRA | SFO | 65.80 | 180 | FRA-CDG<br>CDG-IAD<br>IAD-CMH<br>CMH-SFO |
| • | • | • | | |

BACKBONE NETWORK PERFORMANCE ANALYSIS

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing relies on a large network infrastructure to connect different geographic regions. Data centers in one region communicate with data centers in different regions through multiple transit centers, which collectively form a backbone network. There are multiple users of the backbone network including service teams of the cloud provider and customers of the cloud provider. However, service teams need to be careful not to overload the backbone network, leaving little capacity remaining for the customers.

BRIEF DESCRIPTION OF THE DRAWINGS

FIG. 5 is an example of tunnel data describing hops that are included within the tunnel between a source and destination.

DETAILED DESCRIPTION

Service teams have previously been given little insights into network parameters (available bandwidth, latency, packet loss) over a backbone of the network. The backbone can dynamically change and can be difficult to track due to link/device failures, capacity additions/removals, link/device maintenance, demand growth, topological changes, new site builds, etc. A backbone service exposes the network parameters, such as a minimum available bandwidth in a tunnel path between any source-destination pairs. The network parameters can be mapped as a function of time so that service teams can schedule when to use the backbone with minimized interruption to users.

The data generated by the backbone service can be transmitted, stored or displayed for informational purposes to provide insights to service teams on how to better leverage the network and create awareness of the current status of the backbone. The backbone service can be extended to provide bandwidth brokerage for controlling traffic distribution in the network. The backbone service can further provide triggered messages that inform service teams about failures in the network that could reduce the available bandwidth. The messages can further target users of affected source-destination pairs that are using a specific failed path.

Figure 1:
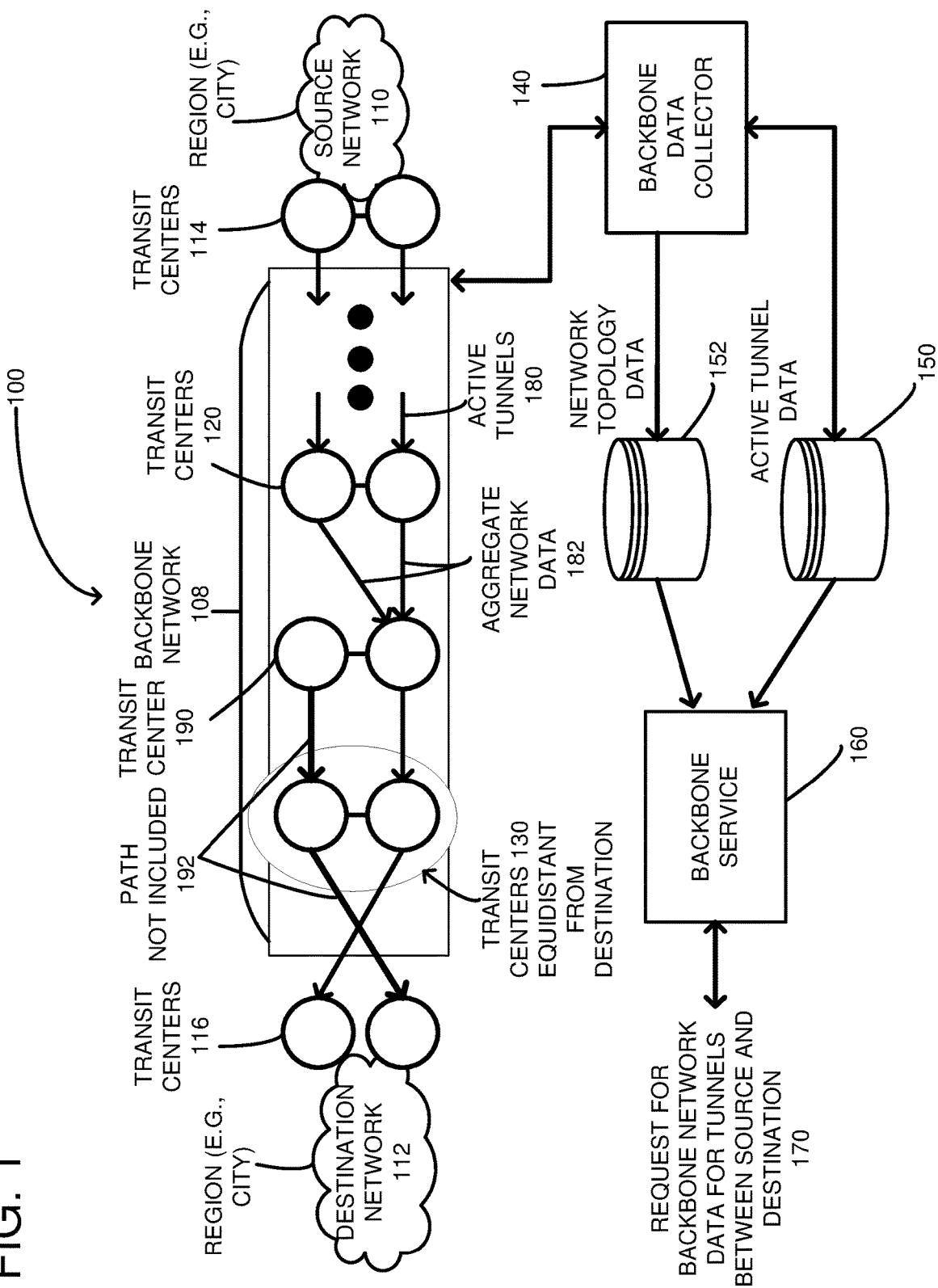
FIG. 1 is an exemplary system diagram for analyzing performance of a backbone network coupled between multiple regions.

FIG. 1 shows a system 100 including a backbone network 108 coupling a source network 110 to a destination network 112. Generally, the source network 110 can be associated with a first region or city (e.g., New York), which is geographically distant from the destination network 112, which can be a second region or city (e.g., San Francisco). A plurality of transit centers 114 and 116 can be considered part of the source network 110 and destination network 112, respectively. Alternatively, the transit centers 114, 116 can be considered part of the backbone network 108. Additional transit centers, such as transit center 120, are illustrated as circles and form the backbone network 108. Transit centers that are shown adjacent to each other, such as shown circled at 130, are within a same geographic region (e.g., a same city).

A backbone data collector 140 is coupled to the backbone network 108 and can collect various metrics, such as current traffic levels associated with network interfaces, network latency associated with network interfaces, packet loss per network interface, blast radius (a function of quantity of traffic and the number of tunnels in the path), link usage efficiency (as a function of directional imbalances in the path, reliability of the network (as a function of outages in the path). Other metrics can also be used such as networking and fiber costs (as a function of capital expenditure and operating expenses in the path). The collected data can be stored in a database 150 associated with tunnels that are propagating through the backbone. Network topology data can be stored in a database 152, which is also coupled to the backbone data collector 140, and can include information such as available paths between transit centers and total capacity of the paths. The network topology data 152 can be updated by the backbone data collector, including when links are taken out of service, etc. A backbone service 160 uses the network topology data 152 and the active tunnel data 150 to determine backbone parameters, such as available bandwidth, latency and packet loss. The backbone service 160 can be responsive to API calls 170 in order to provide backbone parameters between the source and destination networks 110, 112.

In order to evaluate the backbone parameters, the backbone service 160 uses tunnels that are active between the source network 110 and the destination network 112. Active tunnels are shown as arrows, such as arrow 180, between the transit centers 120. Active tunnels means that a stream of packet transmissions is in progress. As shown at 182, when active tunnels have multiple paths to a next transit center, then the network parameters for those multiple paths can be aggregated. For example, when each path has separate capacity because the path is carried on a separate cable and coupled to a network switch on a different interface, then the capacity can be added. On the other hand, multiple tunnels emanating from a same interface and transmitted on a same cable to a next transit center are not summed. Instead, for example, the capacity of the interface is counted once. Still further, some tunnels, such as the tunnel starting at transit center 190, do not have a tunnel coupled back to the source network 110, and, in such a case, the capacity associated with the tunnel is not included, as shown at 192 (note that the tunnel starts at transit center 190).

Thus, the backbone service 160 can analyze the data received from the various databases 150, 152 to determine multiple network parameters, such as bandwidth, latency and packet loss. Such parameters can be transmitted as a response to an API or otherwise displayed to a user as a function of time so that the user has a better understanding of usage of the backbone.

Figure 2:
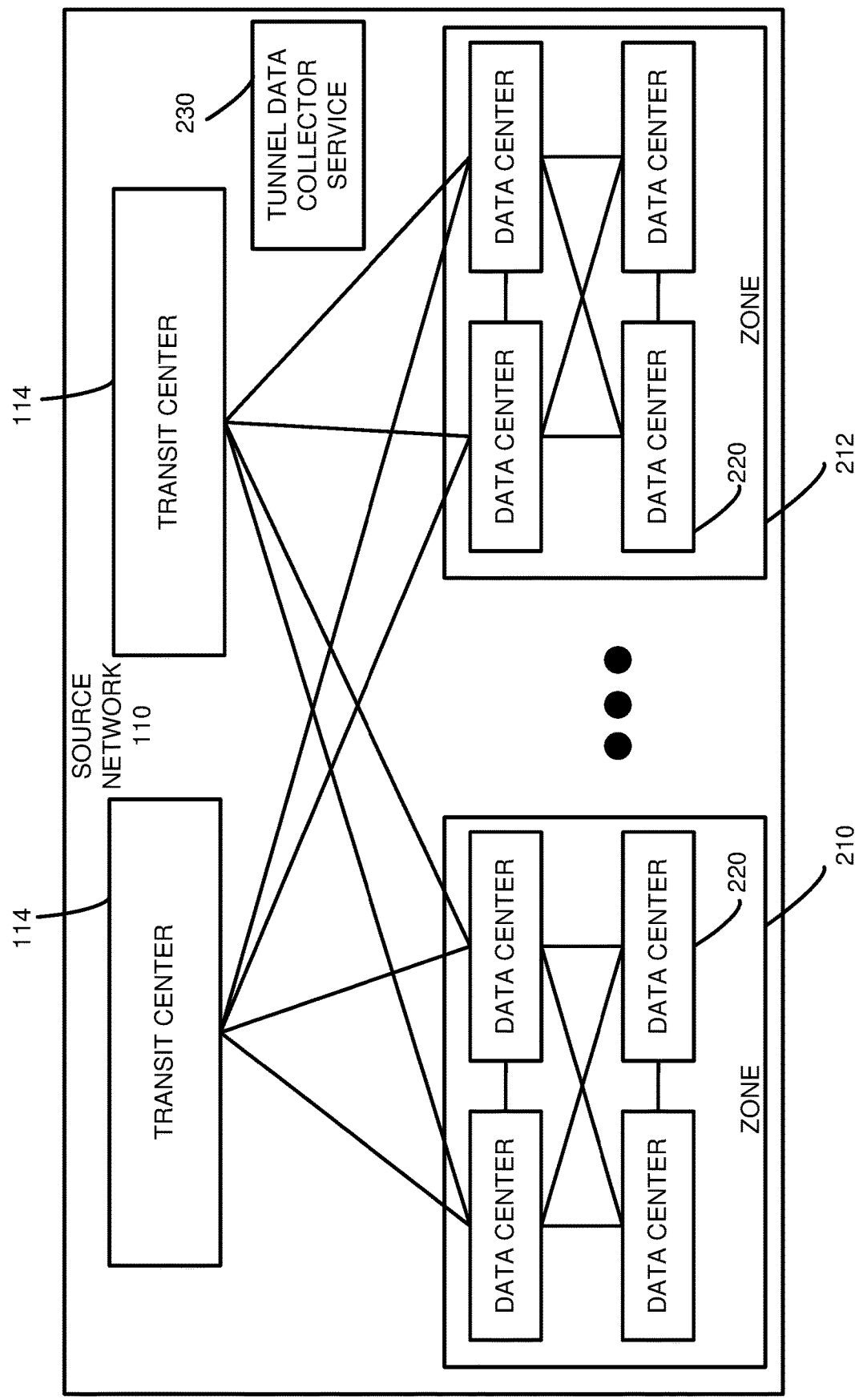
FIG. 2 is an exemplary system diagram of one of the regions coupled to the backbone network of FIG. 1.

FIG. 2 is an exemplary diagram of the source network 110, which includes two or more of the transit centers 114. Typically, the source network 110 is associated with a large city, such as Portland or Seattle. Alternatively, the source network can be associated with a state, a group of states, a country, or another geographic designation. The transit centers 114 are shown as part of the source network 110 but can be considered part of the backbone network 108. The source network 110 includes a cluster of data centers divided into logical groups called zones, such as zones 210, 212. The zones 210, 212 are generally isolated and physically separated from other zones and are typically within different geographic areas. Within a zone, one or more discrete data centers, generically shown at 220, have redundant power, networking and connectivity. A tunnel data collector service 230 communicates with the data centers 220 to obtain data about tunnels that are formed for transmission of packets to the transit centers 114. The tunnel data collector service 230 can provide such tunnel data to the backbone data collector 140 and/or can populate the active tunnel database 150 (FIG. 1). The tunnel data indicates packets being transmitted to and from network devices within the data centers 220 via an active tunnel, such that packets are encapsulated for transmission over the backbone 108.

Figure 3:
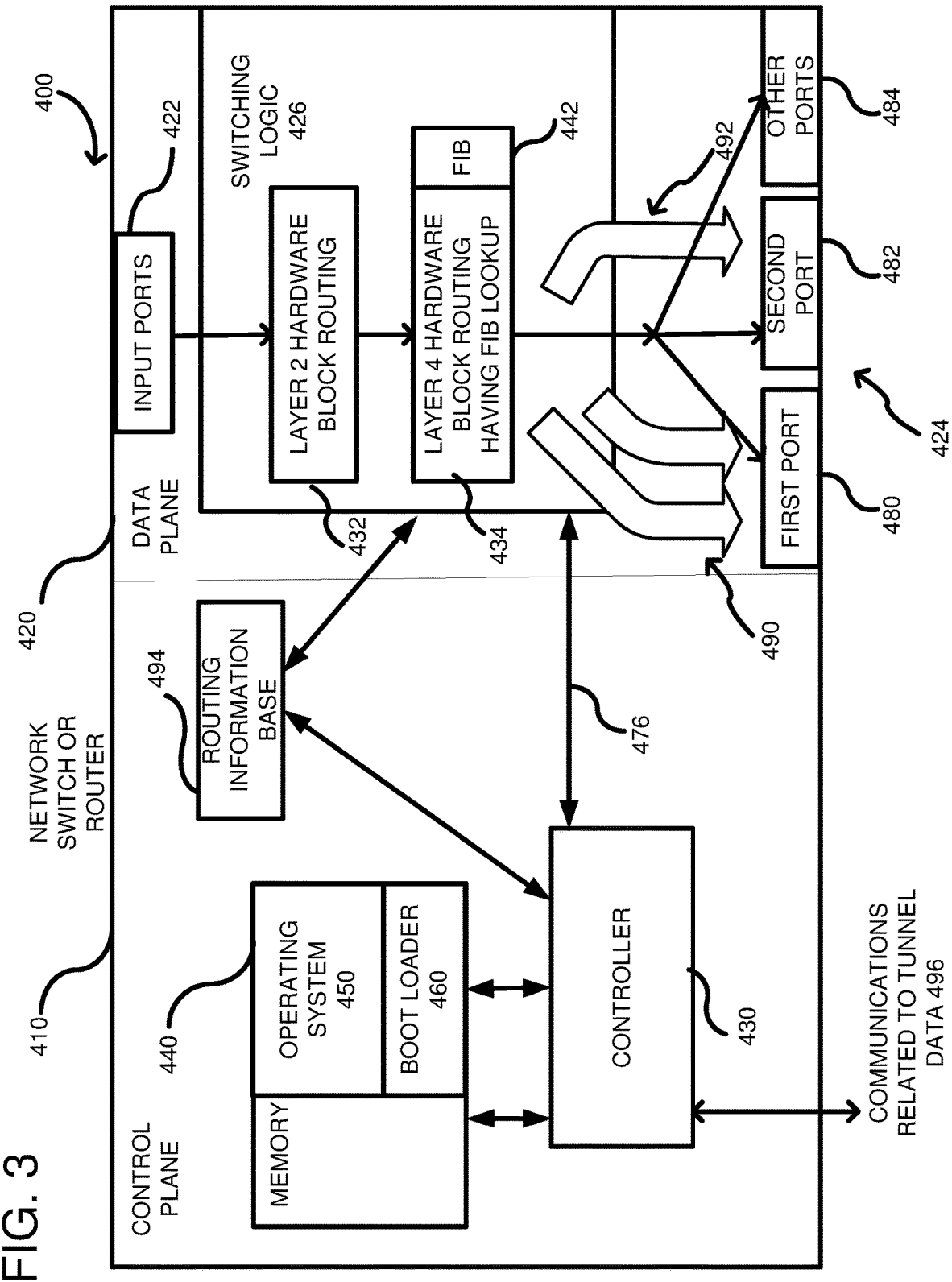
FIG. 3 is an exemplary switch showing tunnels associated with different interfaces of the switch.

FIG. 3 is an embodiment of the network device 400 that is used for forwarding packets to neighbor network devices. The network device 400 includes a control plane 410 and a data plane 420. The control plane 410 is generally a management layer for configuring, updating, and controlling the data plane 420. The control plane includes a controller 430, which can be a Central Processing Unit (CPU), processor, application-specific integrated circuit (ASIC), microcontroller, or any hardware logic that can receive packets and provide switch management and control in response thereto. The controller 430 has access to a memory 440 that can be a Dynamic Random-Access Memory (DRAM), Flash memory, or other type of RAM or ROM. The memory 440 is used to store an operating system 450 for the network device 400. The memory 440 may also include a boot loader program 460, which is a first program executed after a reboot of the controller 430, and which can run basic hardware tests before booting up the operating system 450. Although a single memory is shown, the memory 440 can be divided into multiple memories and even memories of different types. A communications bus 476 allows communications between the controller 430 and the data plane 420. The communications bus 476 can be any desired bus type, such as PCI, PCIe, AGP, etc. The data plane 420 includes input ports 422 (i.e., the ports are also called "interfaces") and output ports 424 used for receiving and sending network packets, respectively. For purposes of explanation, the output ports 424 are shown as including a first port 480, a second port 482 and other ports 484. Any number of output ports or interfaces can be used.

Switching logic 426 is positioned between the input ports 422 and the output ports 424, which are typically adapted to receive network cables, such as Ethernet cables and optical fiber. The switching logic 426 can be a single ASIC integrated circuit or divided into multiple integrated circuits. The switching logic 426 can include multiple different hardware logic blocks including a Layer 2 hardware block 432 and a Layer 3 hardware block 434. The layer 2 hardware block 432 relates to an Ethernet layer and can forward packets based on MAC tables. The layer 3 hardware block 434 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 442, which includes destination addresses for packets being transmitted through the switching logic. The network device 400 can run routing protocols, such as an Open Shortest Path First (OSPF) or a Routing Information Protocol (RIP), to communicate with other Layer 3 switches or routers. Whether it be the FIB or the static routes, the layer 3 hardware is used to lookup the route for an incoming packet. The different hardware blocks can be coupled in series and additional hardware blocks can be added based on the design.

Various tunnels are depicted by arrows at 490. As shown, a first port 480 has two tunnels sharing the same port or interface. In this case, the capacity of the interface is not double counted for the same interface. Instead, the capacity of the interface is only counted a single time, although both tunnels are counted in terms of capacity used. However, if a different interface is used, then the available capacity can be added. For example, a second tunnel 492 is shown using a second port 482 and the available bandwidth of the port 482 can be added to the available bandwidth of port 480 for each of the respective tunnels. In terms of packet loss, the two tunnels shown at 490 can be added and the tunnel shown at 492 can also be added. Thus, whether tunnels share the same interface or not is not relevant to a packet loss determination. The controller 430 can gather usage data associated with the various tunnels and transmit the tunnel data, as shown at 496, to other services, such as the tunnel data collector service 230 (FIG. 2). Although a controller 430 is shown, the controller can be positioned external to the network device 400 so that the routing information base 494 is updated by software.

Figure 4:
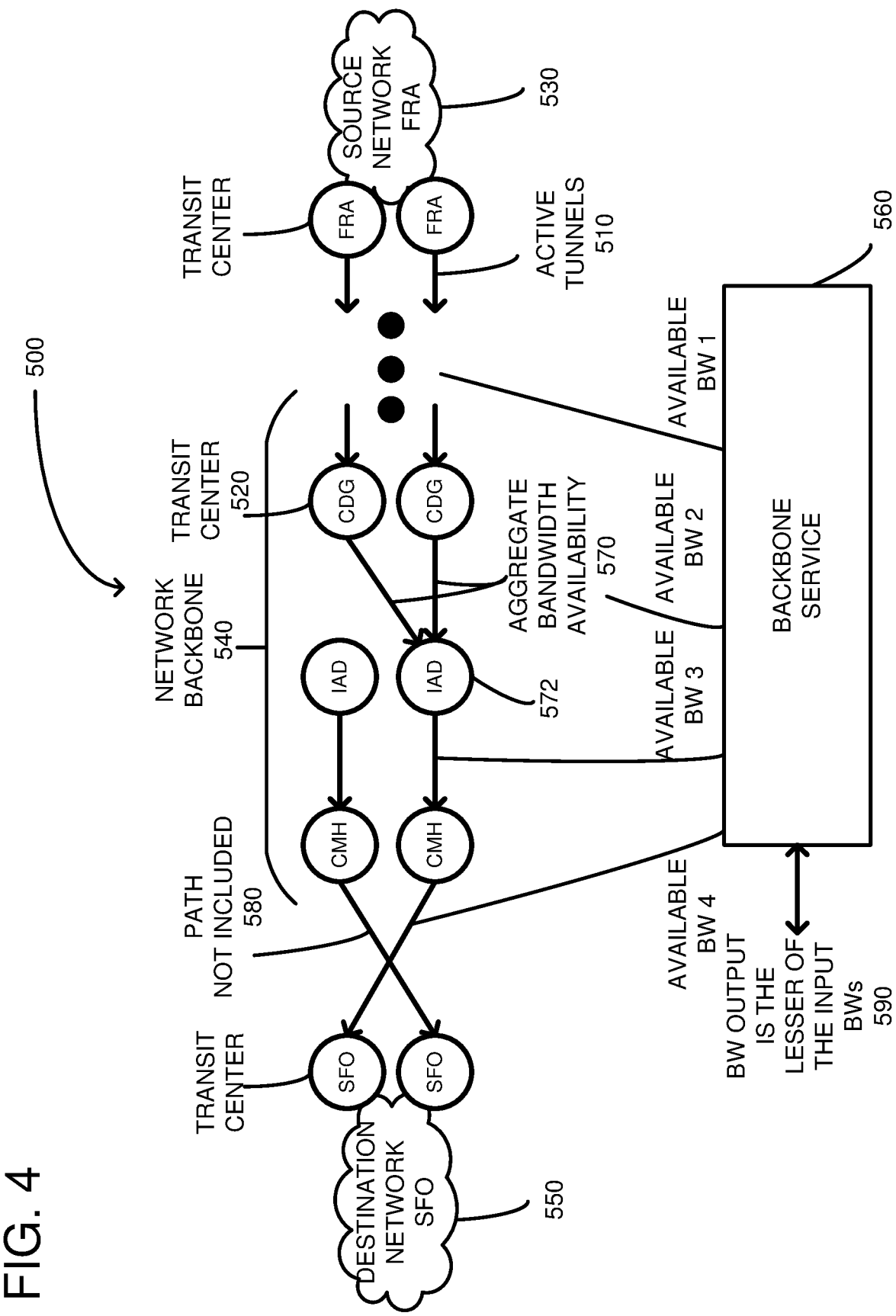
FIG. 4 is a particular example of a system for analyzing performance of a backbone network.

FIG. 4 is a particular example of a system 500 wherein a bandwidth calculation is performed. Active tunnels 510 are shown with arrows between transit centers 520. A source network 530 is Frankfurt (FRA), which has multiple tunnels through a backbone network 540 to a destination network 550, which is shown as San Francisco. The backbone network 540 shows various transit centers including Paris (CDG), Washington D.C. (IAD) and Columbus, Ohio (CMH). Using the databases 150, 152 (FIG. 1), a backbone service 560 analyzes available bandwidth between each of the transit centers by using available capacity minus actual use. In particular, a logical value is computed for each path between transit centers. Transit centers from the same city are considered logically equivalent and can be treated as a single transit center with additional interfaces. Where there are multiple interfaces between the sending transit sender and multiple interfaces on the receiving transit center, as shown at 570, then the bandwidth availability is aggregated. For example, if the transit center 572 has two separate input ports for receipt of tunnel data from different CDG transit centers, then the available bandwidth of each input port is added. On the other hand, when a tunnel does not have a trace back to the source network 530, as shown at 580, then the available bandwidth associated with path 580 is not added into the available bandwidth calculation. The backbone service 560 analyzes all of the logical values computed for the available bandwidth through a comparison and outputs, at 590, the value which is the lowest amount. Consequently, the least available bandwidth represents a bottleneck between the source network 530 and the destination network 550 and is used as the backbone bandwidth. Similar calculations can be made for latency and packet loss, although each logical value between transit centers is added to determine the overall latency and/or packet loss. For latency, when multiple interfaces are associated with a transit center (or multiple transit centers in the same city), the largest latency is used in the calculation.

FIG. 5 illustrates an example of a tunnel data 600, which can be sent from the backbone data collector 140 or the tunnel data collector service 230 to the databases 150, 152. The tunnel data 600 can include a source and destination node (e.g., a network zone) name, tunnel header information (not shown), and a list of next hops. Each next hop can include the next hop node name, the egress logical port to reach the next hop, and a weight. The weights can be simple integer relative weights that indicate the proportion of traffic that can egress to the next hop. Further information can be associated with each tunnel such as a reserved bandwidth, and a total capacity of the interconnections between various transit centers.

Figure 6:
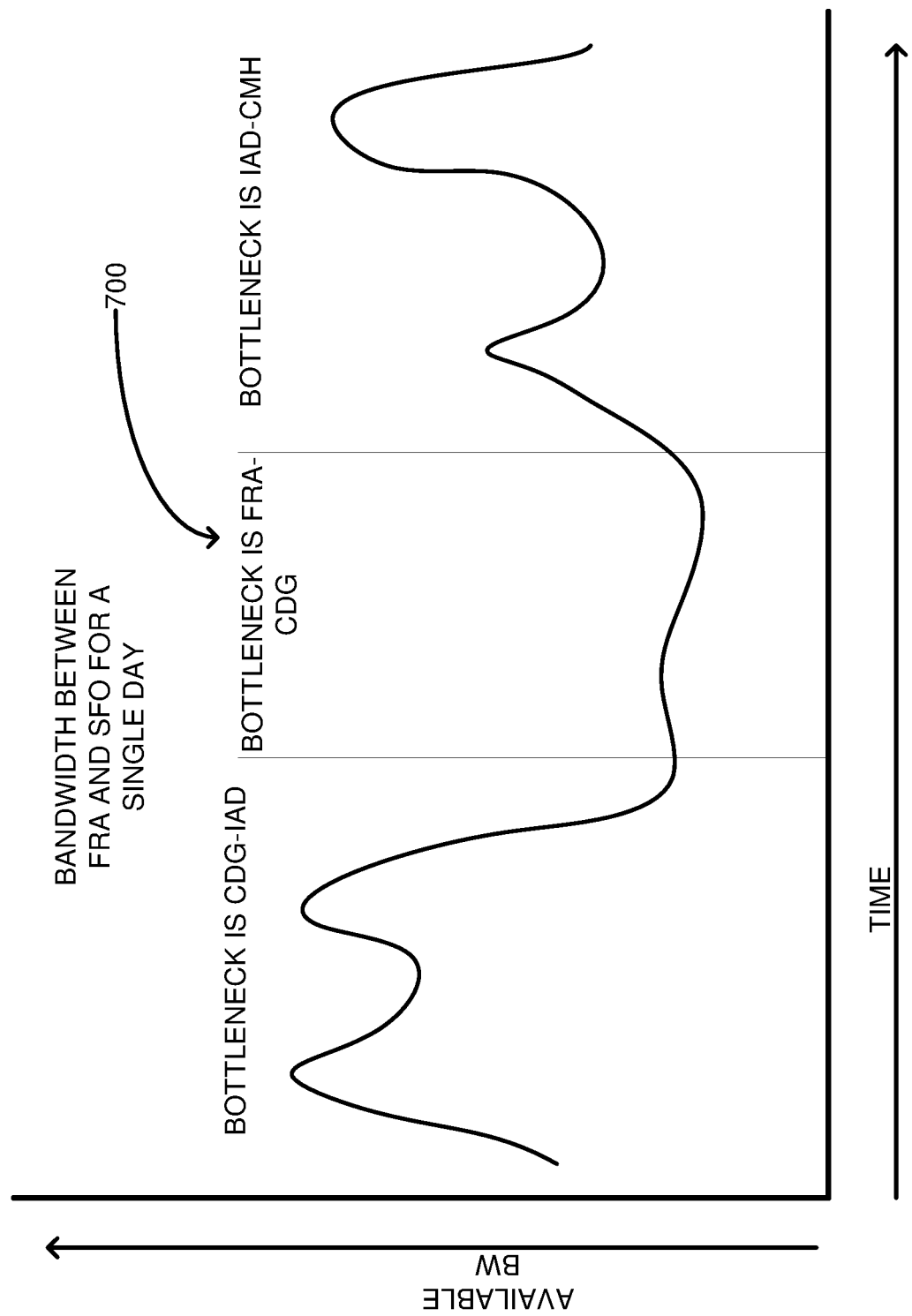
FIG. 6 shows an example output of bandwidth varying in the backbone as a function of time.

FIG. 6 shows an example output of the backbone service 160, which operates on one or more server computers. The graph 700 illustrates available bandwidth as a function of time. Using the graph, users of the backbone can determine when the backbone network has maximum and minimum availability during a day. Service teams of a cloud provider can use such data to ensure that other users have available bandwidth over the backbone network.

Figure 7:
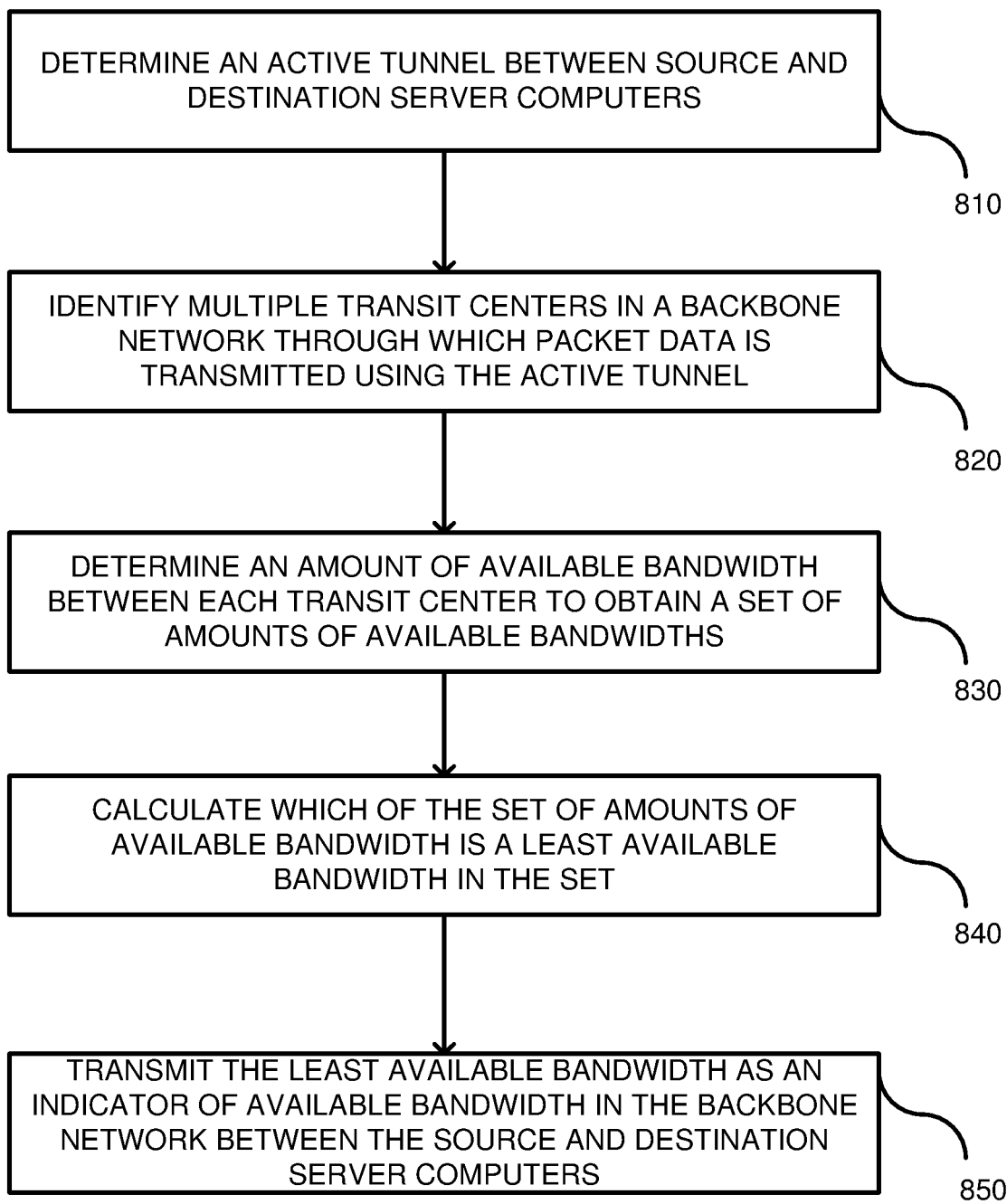
FIG. 7 is a flowchart according to one embodiment for analyzing backbone network performance.

FIG. 7 is a flowchart according to one method of analyzing performance of a backbone network. In process block 810, an active tunnel can be determined between a source and destination. A table, such as is shown in FIG. 6, can be generated showing each of the hops used by the tunnel. In process block 820, using such a table, the multiple transit centers can be identified through which the packet data is transmitted for the tunnel. An amount of bandwidth can be determined between each transit center in process block 830. An installed capacity can be obtained from topology data, such as is shown in database 152 (FIG. 1). The installed capacity is dependent upon the physical hardware, such as the cable coupled between transit centers. Bandwidth currently being used on each interface can be determined, as such information is provided by the network switches as shown at 496 (FIG. 3). If multiple tunnels use a same interface, as shown at 490 in FIG. 3, then the available bandwidth is the capacity of the interface minus the packet transmissions of both tunnels. On the other hand, if tunnels are transmitted on different interfaces, such as the tunnel 490 and 492, then the availability can be summed. Reserved capacity can also be subtracted from the available capacity. Whatever the case, a single logical value is determined for available bandwidth between each transit center. In process block 840, the logical values computed in process block 830 are analyzed and compared to determine which is the smallest value of the set, which represents the overall bandwidth of the backbone network. In process block 850, the smallest available bandwidth is transmitted as an indicator of available bandwidth between the source and destination computers. For example, in FIG. 1, the backbone service 160 can respond to an API call 170 with the bandwidth or a user interface graph can be presented as shown at 700 in FIG. 6.

Figure 8:
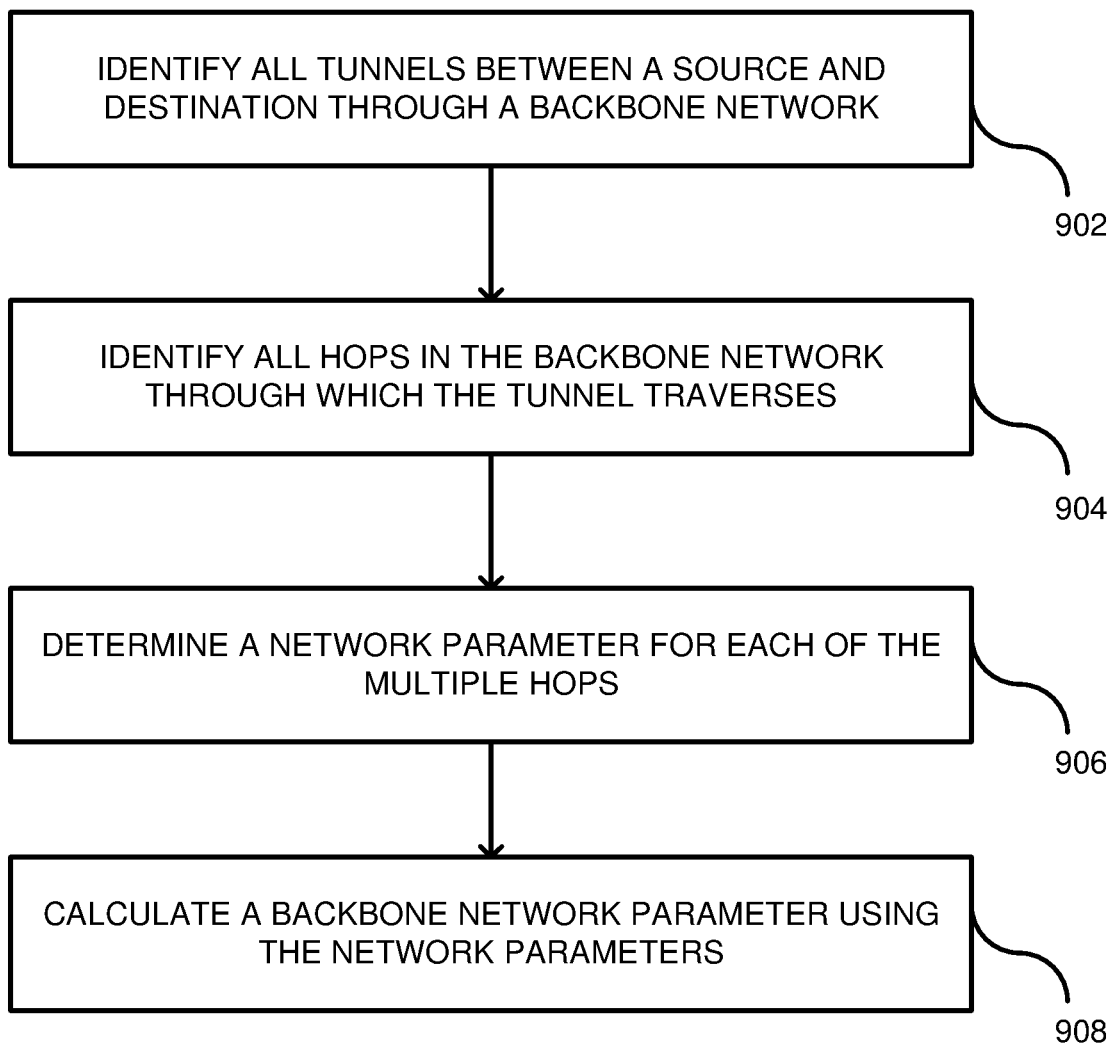
FIG. 8 is a flowchart according to another embodiment for analyzing backbone network performance.

FIG. 8 is a flowchart according to another embodiment for determining network parameters of a backbone network, such as bandwidth, latency or packet loss. In process block 902, all tunnels can be identified between a source and destination through a backbone network. Such tunnels can be identified deterministically from topology data (see FIG. 5) and network probes are not needed. In process block 904, all hops can be identified in the backbone network through which the tunnel traverses. For example, the backbone data collector 140 can populate the database 150, which deterministically indicates hops through which the tunnel propagates. FIG. 5 indicates how such data can be represented, which indicates that for any source/destination pair, a plurality of hops (e.g., transit centers) can be listed. In process block 906, a network parameter is determined for each of the multiple hops. For example, a bandwidth, packet loss or latency can be determined for each of the hops that were identified. For example, in FIG. 3, at 496, each individual switch can transmit parameters associated with the switch including packet volume, latency or packet loss. In process block 908, a backbone network parameter can be calculated using the network parameters. For example, in FIG. 1, the backbone service 160 through a summation (for packet loss or latency) or a minimum available bandwidth associated with the identified hops, can determine an overall parameter for the backbone.

Figure 9:
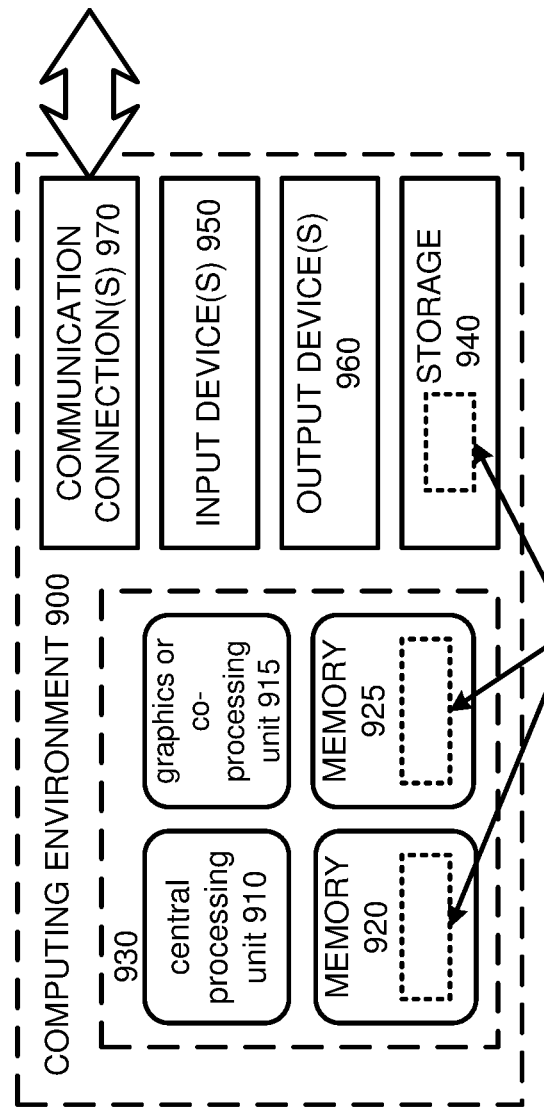
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s). For example, the computing environment can be used as the backbone service 160 (FIG. 1).

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of analyzing performance of a backbone network, the method comprising:
  using a backbone data collector coupled to the backbone network to collect data regarding the backbone network;
  using an active tunnel data database coupled to the backbone data collector and a backbone service operating on one or more server computers to receive and store data collected by the backbone data collector associated with active tunnels that are propagating through the backbone network;
  using a network topology database coupled to the backbone data collector and the backbone service to receive and store data collected by the backbone data collector regarding paths between transit centers of the backbone network;
  using the backbone service to determine an active tunnel between a source network device and a destination network device that traverses the backbone network, the source network device located in a data center of a source network associated with a first region, the destination network device located in a data center of a destination network associated with a second region, the first region being geographically distant from the second region, the backbone network coupling the source network to the destination network, and the backbone service being coupled to the backbone network;

using the backbone service to identify multiple transit centers in the backbone network through which packet data is transmitted using the active tunnel;

using the backbone service to determine an amount of available bandwidth between each transit center through which the active tunnel passes to obtain a set of amounts of available bandwidth between the transit centers;

using the backbone service to calculate which of the set of amounts of available bandwidth is a least available bandwidth in the set; and using the backbone service to transmit the least available bandwidth as an indicator of available bandwidth in the backbone network between the source and destination network devices, wherein the backbone service receives the amount of available bandwidth between each transit center, which is used to calculate which of the set of amounts of available bandwidth is the least available bandwidth in the set, from the active tunnel data database and the network topology database.

2. The method of claim 1, wherein the multiple transit centers are in different geographical regions and wherein determining the amount of available bandwidth further comprises:

determining transit centers that are in a same geographical region;

determining available bandwidth for each of the transit centers in the same geographical region; and summing the available bandwidth for each of the transit centers in the same geographical region and including the sum as a single logical amount of available bandwidth in the set of amounts of available bandwidth.

3. The method of claim 2, further comprising for transit centers in the same geographic region, excluding available bandwidth for a transit center that does not transmit packets associated with a tunnel between the source and destination network devices.

4. The method of claim 1, wherein the determining of the available bandwidth for each of the transit centers includes determining an installed capacity of paths between transit centers and subtracting capacity currently being used.

5. The method of claim 4, wherein the determining of the available bandwidth further includes subtracting a reserved capacity.

6. One or more computer-readable storage media comprising computer-executable instructions that, when executed, cause a computing system to perform a method, comprising:

collecting, by a backbone data collector coupled to a backbone network, data regarding the backbone network, the backbone network comprising a plurality of transit centers;

receiving and storing, by an active tunnel data database coupled to the backbone data collector and a backbone service, data collected by the backbone data collector associated with tunnels that are propagating through the backbone network;

receiving and storing, by a network topology database coupled to the backbone data collector and the backbone service, data collected by the backbone data collector regarding paths between the transit centers of the backbone network;

identifying, by the backbone service, all tunnels between a source network device and a destination network device through the backbone network, the source network device located in a data center of a source network associated with a first region, the destination network device located in a data center of a destination network associated with a second region, the first region being geographically distant from the second region, and the backbone service being coupled to the backbone network;

identifying, by the backbone service, all hops in the backbone network through which the tunnels traverse, the hops being transit centers in the backbone network;

determining, by the backbone service, a network parameter for each of the hops; and calculating, by the backbone service, a backbone network parameter using the network parameters for the hops, wherein the backbone network parameter represents the network parameter for the backbone network between the source network device and the destination network device, wherein the backbone service receives the network parameters for the hops, which are used to calculate the backbone network parameter, from the active tunnel data database and the network topology database.

7. The one or more computer-readable storage media of claim 6, wherein the network parameter is one of the following: an available bandwidth, a latency, or a packet loss.

8. The one or more computer-readable storage media of claim 7, wherein the network parameter is the available bandwidth and wherein the method includes identifying an interface on each of multiple hops that a tunnel uses and comparing the available bandwidth on each interface to determine which available bandwidth is a least bandwidth, and assigning the least bandwidth to the backbone network parameter.

9. The one or more computer-readable storage media of claim 8, further including identifying multiple tunnels using a same interface and only using the same interface once in the available bandwidth comparison.

10. The one or more computer-readable storage media of claim 7, wherein the network parameter is packet loss and wherein the method includes identifying an interface on each of multiple hops that a tunnel uses and summing the packet loss for each of the interfaces to determine the backbone network parameter, which is packet loss across the backbone network between the source network device and the destination network device.

11. The one or more computer-readable storage media of claim 6, further including identifying first and second hops of multiple hops that are within a same geographic region and which each support tunnels between the source network device and destination network device through the backbone network, and summing network parameters for the first and second hops that are in the same geographic region.

12. The one or more computer-readable storage media of claim 6, wherein the method further includes determining an available bandwidth for each of the transit centers including determining an installed capacity of paths between transit centers and subtracting a capacity currently being used.

13. The one or more computer-readable storage media of claim 12, wherein the determining of the available bandwidth further includes subtracting a reserved capacity.

14. The one or more computer-readable storage media of claim 6, wherein the first region is a first city and the second region is a second city.

15. A system, comprising:
a plurality of network devices including interfaces used in switching network traffic, wherein the plurality of network devices form a backbone network through which the network traffic is transmittable, and wherein the plurality of network devices are within transit centers in different geographic regions of the backbone network; and a backbone service operating on one or more server computers coupled to the backbone network,
the backbone service being operable to perform the following:
identify a set of the interfaces that form a tunnel through the plurality of network devices between a source network device and a destination network device, the source network device located in a data center of a source network associated with a first region, the destination network device located in a data center of a destination network associated with a second region, and the first region being geographically distant from the second region;
receive network parameters associated with the set of interfaces; and calculate a backbone network parameter using the received network parameters for the set of interfaces, wherein the backbone network parameter represents the network parameter over the backbone network between the source network device and the destination network device;
a backbone data collector coupled to the backbone network and configured to collect data regarding the backbone network;
an active tunnel data database coupled to the backbone data collector and the backbone service, the active tunnel data database receiving and storing data collected by the backbone data collector associated with tunnels that are propagating through the backbone network; and
a network topology database coupled to the backbone data collector and the backbone service, the network topology database receiving and storing data collected by the backbone data collector regarding paths between the transit centers of the backbone network,
wherein the backbone service receives the network parameters for the set of interfaces, which are used to calculate the backbone network parameter, from the active tunnel data database and the network topology database.

16. The system of claim 15, wherein the backbone network parameter is an available bandwidth over the backbone network and wherein the calculation includes determining which of the received network parameters is a lowest value and using the lowest value as the available bandwidth of the backbone network.

17. The system of claim 16, wherein the backbone service is further operable to perform the following:
identify multiple tunnels that use a same interface and ensure that only one of the identified multiple tunnels is used in the calculation of available bandwidth.

18. The system of claim 15, wherein the received network parameters are associated with packet loss, latency, a blast radius, a link usage efficiency, costs associated with the backbone network, or a reliability of the backbone network.

19. The system of claim 15, wherein the backbone network traverses multiple cities in different geographic locations, and wherein the backbone service is further operable to perform the following:
identify interfaces in the set of interfaces that are within a predetermined distance from each other and combine the network parameters from the identified interfaces.

* * * * *